(12) United States Patent
McDonald

(10) Patent No.: US 8,328,142 B2
(45) Date of Patent: Dec. 11, 2012

(54) AILERON ACTUATOR BRACKET

(75) Inventor: Lynn McDonald, Bristol (GB)

(73) Assignee: Airbus Operations Limited, Bristol (GB)

( * ) Notice: Subject to any disclaimer, the term of this patent is extended or adjusted under 35 U.S.C. 154(b) by 510 days.

(21) Appl. No.: 12/246,757

(22) Filed: Oct. 7, 2008

(65) Prior Publication Data

US 2009/0127406 A1 May 21, 2009

(30) Foreign Application Priority Data

Nov. 15, 2007 (GB) .................................. 0722390.2

(51) Int. Cl.
*B64C 3/50* (2006.01)
(52) U.S. Cl. ....................... 244/215; 244/213; 244/99.2
(58) Field of Classification Search .................. 244/213, 244/215, 99.2, 99.3, 90 R; *B64C 9/02*
See application file for complete search history.

(56) References Cited

U.S. PATENT DOCUMENTS

| | | | | |
|---|---|---|---|---|
| 2,053,064 A | * | 9/1936 | Cederwall | 244/90 R |
| 2,211,870 A | * | 8/1940 | Wagner et al. | 244/90 B |
| 2,254,304 A | * | 9/1941 | Miller | 244/216 |
| 2,370,893 A | * | 3/1945 | Utsch | 244/90 B |
| 2,650,047 A | * | 8/1953 | Stoner et al. | 244/214 |
| 2,677,512 A | * | 5/1954 | Kirkbride et al. | 244/216 |
| 2,718,366 A | * | 9/1955 | Darby | 244/90 A |
| 4,131,253 A | * | 12/1978 | Zapel | 244/219 |
| 4,444,368 A | * | 4/1984 | Andrews | 244/216 |
| 4,687,162 A | * | 8/1987 | Johnson et al. | 244/213 |
| 4,705,236 A | * | 11/1987 | Rudolph | 244/90 R |
| 4,763,862 A | * | 8/1988 | Steinhauer et al. | 244/215 |
| 5,388,788 A | * | 2/1995 | Rudolph | 244/215 |
| 7,600,718 B2 | * | 10/2009 | Perez-Sanchez | 244/215 |
| 2002/0047068 A1 | * | 4/2002 | Uchida et al. | 244/75 R |
| 2006/0226296 A1 | * | 10/2006 | Perez-Sanchez | 244/215 |
| 2007/0114328 A1 | * | 5/2007 | Lacy et al. | 244/34 R |
| 2008/0265089 A1 | * | 10/2008 | Zeumer | 244/99.3 |

FOREIGN PATENT DOCUMENTS

| | | |
|---|---|---|
| EP | 0075966 A2 | 4/1983 |
| EP | 0239138 A2 | 9/1987 |
| EP | 0947421 A1 | 10/1999 |
| EP | 1619119 A2 | 1/2006 |
| GB | 1123620 | 8/1968 |
| JP | 8-26192 A | 1/1996 |
| WO | 01/05654 A2 | 1/2001 |
| WO | 2007057638 A1 | 5/2007 |

OTHER PUBLICATIONS

UK Search Report for GB0722390.2 dated Mar. 12, 2008.

* cited by examiner

*Primary Examiner* — Christopher P Ellis
(74) *Attorney, Agent, or Firm* — Lowe Hauptman Ham & Berner, LLP

(57) ABSTRACT

An aircraft wing comprising: a trailing edge cove extending in a span-wise direction along a trailing edge of the wing, the trailing edge cove having a front face, a top face and a bottom face; an actuator bracket which is mounted to the front and top faces of the trailing edge cove, but not to its bottom face; an aileron actuator coupled at one end to an aileron and at the other end to the actuator bracket, the aileron actuator being adjustable from a retracted position to a deployed position to deploy the aileron; and a channel extending in a span-wise direction along the wing and positioned below the actuator bracket.

12 Claims, 3 Drawing Sheets

AILERON ACTUATOR BRACKET

RELATED APPLICATIONS

The present application is based on, and claims priority from, British Application Number 0722390.2, filed Nov. 15, 2007, the disclosure of which is hereby incorporated by reference herein in its entirety.

FIELD OF THE INVENTION

The present invention relates to an aircraft wing incorporating an aileron actuator bracket.

BACKGROUND OF THE INVENTION

EP 0947421 A1 shows an aileron actuator system comprising an aileron actuator jack which is pivotally mounted at one end to a bracket on the wing and at its other end to a bracket on the aileron.

The bracket on the wing is located in a trailing edge cove extending in a span-wise direction along a trailing edge of the wing. This cove must also accommodate various other elements such as electric and hydraulic systems. A problem with the conventional bracket of EP 0947421 A1 is that it takes up a large amount of space in the trailing edge cove, making it difficult to accommodate such other elements. Space is available above the aileron actuator jack, but this area can be difficult to access for inspection and maintenance purposes.

SUMMARY OF THE INVENTION

The present invention provides an aircraft wing comprising: a trailing edge cove extending in a span-wise direction along a trailing edge of the wing, the trailing edge cove having a front face, a top face and a bottom face; an actuator bracket which is mounted to the front and top faces of the trailing edge cove but not to its bottom face; an aileron actuator coupled at one end to an aileron and at the other end to the actuator bracket, the aileron actuator being adjustable from a retracted position to a deployed position to deploy the aileron; and a channel extending in a span-wise direction along the wing and positioned below the actuator bracket.

The channel below the actuator bracket provides a relatively large and accessible area to accommodate systems such as electric cables or hydraulic pipes which extend along the channel in a span-wise direction along the wing. By mounting the bracket to both the upper and front faces of the cove, loads can be efficiently transmitted into the fixed structure of the wing.

The various faces of the trailing edge cove may be defined by a number of different elements. For example:
 the front face of the trailing edge cove, to which the actuator bracket is mounted, may comprise a rear spar of the wing, and/or any other element
 the top face of the trailing edge cove, to which the actuator bracket is mounted, may comprise an upper flange of a spar, an element which is attached to a spar and overhangs to its rear, and/or any other element.
 the bottom face of the trailing edge cove may comprise a lower flange of a spar, an element which is attached to a spar and overhangs to its rear, and/or any other element.

Typically the actuator bracket comprises a front web which is mounted to the front face of the trailing edge cove; and a top web which is mounted to the top face of the trailing edge cove. Preferably the front web of the actuator bracket has a bottom edge, which partially defines a top face of the channel, and is positioned less than half-way down the height of the front face of the trailing edge cove. This maximises the size of the channel.

Typically the area of the actuator bracket which engages the top face of the trailing edge cove is greater than the area of the actuator bracket which engages the front face of the trailing edge cove. This enables the actuator bracket to transmit more loads into the top face of the trailing edge cove.

The actuator may be mounted to the front and top face of the trailing edge cove by fasteners or by bonding. In the case of bonding the bracket may comprise a composite material which is co-cured to the front and/or top face of the trailing edge cove.

In the case where fasteners are used, then preferably the actuator bracket is mounted to the top face of the trailing edge cove with a first set of fasteners, and to the front face of the trailing edge cove by a second set of fasteners.

BRIEF DESCRIPTION OF THE DRAWINGS

An embodiment of the invention will now be described with reference to the accompanying drawings, in which.

DETAILED DESCRIPTION OF EMBODIMENT(S)

Figure 1:
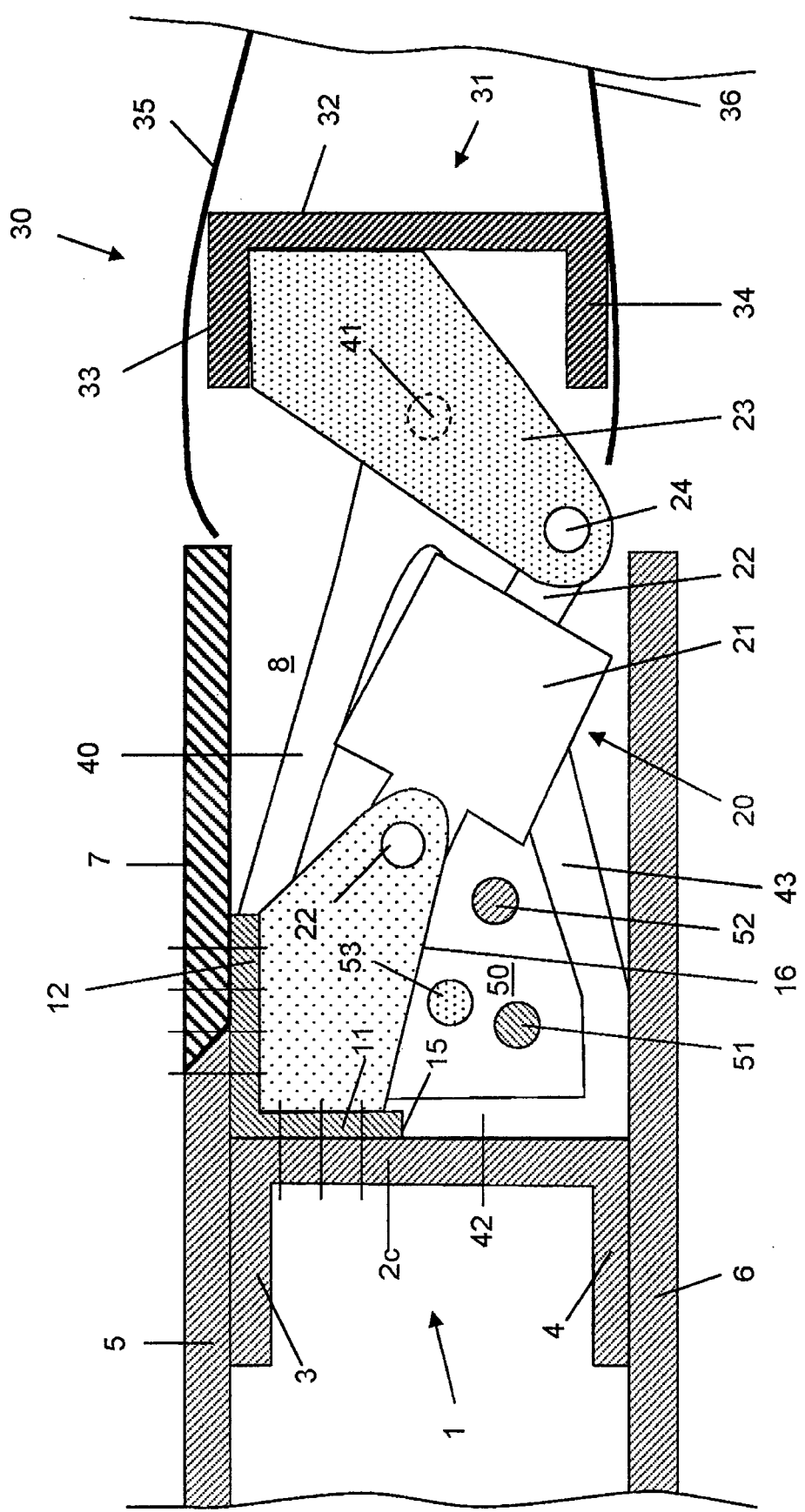
FIG. 1 is a sectional view through the trailing edge of an aircraft wing.
Figure 2:
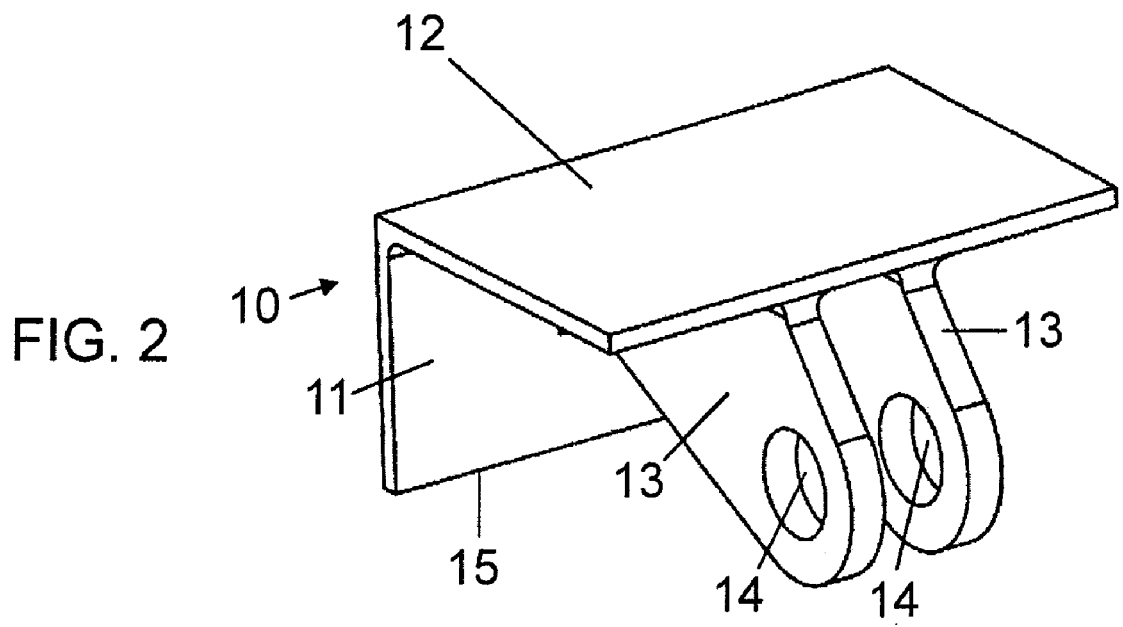
FIG. 2 is an isometric view of the actuator bracket.

FIG. 1 is a chord-wise cross-section through the trailing edge of an aircraft wing. Note that FIG. 1 is schematic and the relative sizes of the various components may vary from those shown. The wing comprises a wing-box having a front spar (not shown); a C-section rear spar 1 having a web 2, an upper flange 3, and a lower flange 4; an upper cover 5; and a lower cover 6.

The upper cover 5 is attached to the upper flange of the rear spar 3 and overhangs the spar web 2 to its front and rear. A top panel 7 is attached to the upper cover 5 by butt straps 17 and bridges the area between the upper cover 5 and an upper skin 35 of an aileron 30. The lower cover 6 is attached to the lower flange of the rear spar 4 and overhangs the spar web 4 to its front and rear. A bottom panel 9 is attached to the lower cover 6 by butt straps 18 and bridges the area between the lower cover 6 and a lower skin 36 of the aileron 30.

The spar web 2, upper cover 5, top panel 7, lower cover 6 and bottom panel 9 together define the front, top and bottom faces respectively of a trailing edge cove 8 which extends in a span-wise direction along the trailing edge of the wing.

Figure 3:
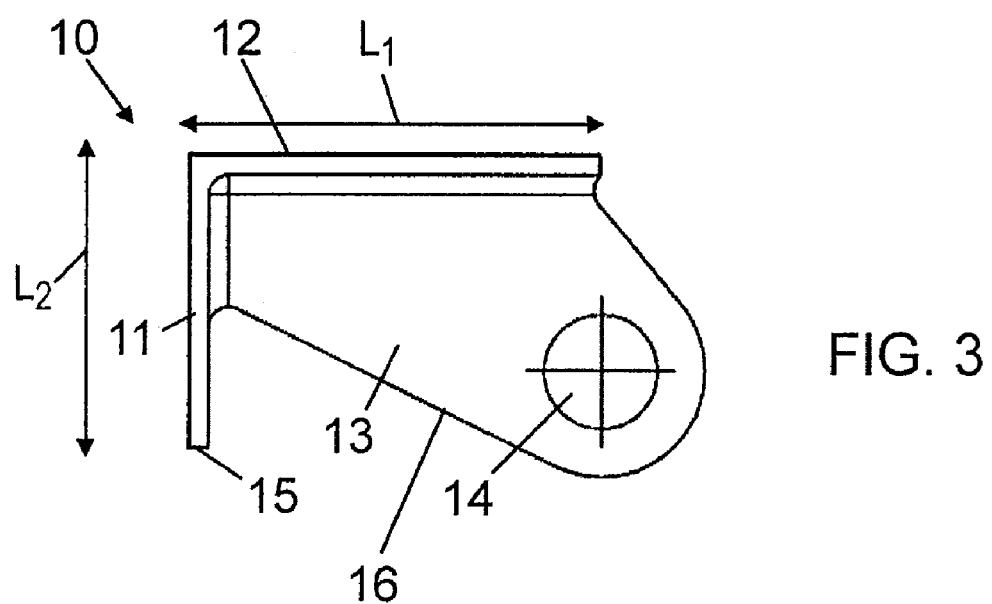
FIG. 3 is a side view of the actuator bracket.
Figure 4:
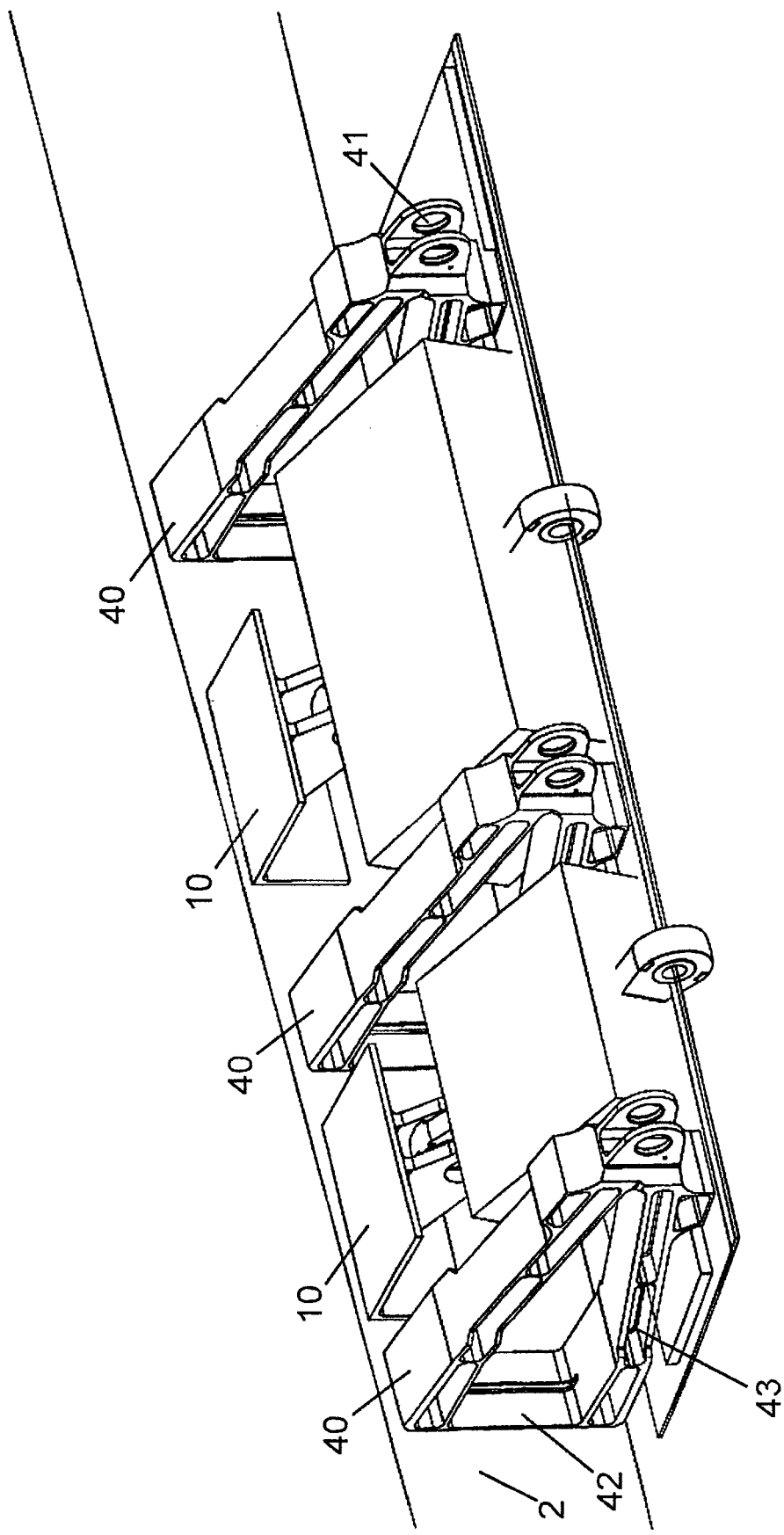
FIG. 4 is an isometric view showing selected parts of the trailing edge of the aircraft wing shown in FIG. 1.

An actuator bracket 10 shown in detail in FIGS. 3 and 4 comprises a top web 12 which is mounted to the upper cover 5 by a first set of fasteners, and a front web 11 which is mounted to the rear spar web 2 by a second set of fasteners. Four fasteners from the first set and three fasteners from the second set are shown schematically in FIG. 1. A pair of lugs 13 with holes 14 extend from the webs 11,12 as shown most clearly in FIG. 3.

The aileron 30 comprises a C-section spar 31 having a web 32, an upper flange 33, and a lower flange 34; an upper skin 35; and a lower skin 36. An aileron bracket 23 is mounted to the upper flange 33 and to the web 32 of the spar 31.

An aileron actuator jack 20 comprises a hydraulic cylinder 21 with an arm which is located between the lugs 13 and pivotally attached to the actuator bracket 10 by a pivot pin 22 passing through the holes 14. A ram 25 extends from the cylinder 21 and is pivotally coupled to the aileron bracket 23 by an actuator pivot pin 24.

Referring now to FIG. 4, three aileron hinge ribs 40 are mounted to the spar flange 2. The hinge ribs 40 have bases 42 mounted to the spar, arms 43, and pivot holes 41 which receive aileron pivot pins (not shown) to which the aileron is attached. The pivot holes define the pivot axis of the aileron.

As shown in FIG. 4, the aileron actuator bracket 10 shown in FIG. 1 is one of two such brackets. Note that in FIG. 4 certain elements of the wing which are shown in FIG. 1 are omitted for purposes of clarity. Also, the detailed structure of the actuator jacks is replaced by elements which represent the volume occupied by the jacks. Note that this volume is larger than the volume of the jacks 20 illustrated schematically in FIG. 1.

Due to the offset between the actuator pivot pins 24 and the pivot holes 41 on the aileron hinge ribs, as the actuator jack 20 is adjusted from a retracted position to a deployed (expanded) position, the aileron is deployed by pivoting upwards. Similarly as the actuator jack 20 contracts, the aileron is deployed by pivoting downwards.

Because the actuator bracket 10 is attached only to the upper and front faces of the cove 8 (and not to its bottom face as defined by the lower skin 6) a channel 50 is present as shown in FIG. 1 below the bracket 10. This channel 50 extends in a span-wise direction along the wing, and has a front face defined partially by the spar flange 2 and partially by the bases 42 of the aileron hinge ribs, a top face defined by a bottom face 16 of the actuator bracket 10, and a bottom face defined partially by the upper face of the lower skin 6 and partially by the lower arms 43 of the aileron hinge ribs.

System lines are located in the channel 50 and extend in a span-wise direction along the wing. Electrical control lines 51,52 and a hydraulic control line 53 are shown by way of example in FIG. 1. The electrical control lines 51, 52 may, for example, comprise flight test instrumentation lines.

Note that the front web 11 of the actuator bracket has a bottom edge 15 which partially defines the top face of the channel 50. This bottom edge 15 is positioned less than half-way down the height of the spar web 2 as shown in FIG. 1.

The arrangement of FIG. 1 has a number of advantages compared with the arrangement of EP 0947421 A1, including:

- as shown in FIG. 3, the length $L_1$ of the top web 12 is greater than the length $L_2$ of the front web 11. Thus the area of the top web 12 which engages the upper cover 5 is greater than the area of the front web 11 which engages the spar web 2. This enables the top web 12 to accommodate more fasteners than the front web 11, and thus transfer more actuator loads during deployment of the aileron. This is advantageous because the actuator jack 20 is directed more towards the upper cover 5 than towards the spar web 2
- the channel 50 below the aileron actuator bracket 10 can accommodate a large number of systems such as control or data lines. As a result, fewer such control or data lines need to be accommodated in the area between the top of the actuator jack 20 and the top panel 7
- the channel 50 has a relatively large cross-sectional area, making it relatively easy to feed the systems 51-53 along its length
- the channel 50 is easily accessible from below the actuator jack 20 for inspection and maintenance purposes Although the invention has been described above with reference to one or more preferred embodiments, it will be appreciated that various changes or modifications may be made without departing from the scope of the invention as defined in the appended claims.

For instance the C-section rear spar 1 may be replaced by and H-section spar (that is, with flanges extending to the rear of the web 2 as well as in front of the web) or by a C-section spar which is a mirror-image of the spar 1 with its flanges extending to the rear of the web 2. In this case the top web 11 of the actuator bracket may be mounted to the spar flange which extends to the rear of the web 2, instead of being mounted to the upper cover 5.

As a further alternative, the upper cover 5 may not overhang to the rear of the spar 1, and in this case the top web 11 of the actuator bracket may be mounted to the top panel 7 instead of being mounted to the upper cover 5.

The invention claimed is:

1. An aircraft wing comprising:
   a trailing edge cove extending in a span-wise direction along a trailing edge of the wing, the trailing edge cove having a front face, a top face and a bottom face;
   an actuator bracket which is mounted to the front and top faces of the trailing edge cove but not to its bottom face;
   an aileron actuator coupled at one end to an aileron and at the other end to the actuator bracket, the aileron actuator being adjustable from a retracted position to a deployed position to deploy the aileron; and
   a channel extending in a span-wise direction along the wing and positioned below the actuator bracket;
   wherein the actuator bracket comprises a front web which is mounted to the front face of the trailing edge cove; a top web which is mounted to the top face of the trailing edge cove; and a lug which extends from said front web and said top web.

2. The wing according to claim 1, further comprising one or more systems located in the channel and extending in a span-wise direction along the wing.

3. The wing according to claim 1, wherein the front face of the trailing edge cove, to which the actuator bracket is mounted, comprises a rear spar of the wing.

4. The wing according to claim 1, wherein the top face of the trailing edge cove, to which the actuator bracket is mounted, comprises an element which is attached to a rear spar of the wing and overhangs to its rear.

5. The wing according to claim 4, wherein the element attached to the rear spar of the wing also overhangs to its front.

6. The wing according to claim 1, wherein the front web of the actuator bracket has a bottom edge which partially defines the top face of the channel.

7. The wing according to claim 6, wherein the bottom edge of the front web of the actuator bracket is positioned less than half-way down the height of the front face of the trailing edge cove.

8. The wing according to claim 1, wherein the area of the actuator bracket which engages the top face of the trailing edge cove is greater than the area of the actuator bracket which engages the front face of the trailing edge cove.

9. The wing according to claim 1, wherein the actuator bracket is mounted to the top face of the trailing edge cove with a first set of fasteners, and to the front face of the trailing edge cove by a second set of fasteners.

10. The wing according to claim 1, wherein the actuator bracket is pivotally attached to the aileron actuator.

11. An aircraft wing comprising:
a trailing edge cove extending in a span-wise direction along a trailing edge of the wing, the trailing edge cove having a front face, a top face and a bottom face;
an actuator bracket which is mounted to the front and top faces of the trailing edge cove but not to its bottom face;
an aileron actuator coupled at one end to an aileron and at the other end to the actuator bracket, the aileron actuator being adjustable from a retracted position to a deployed position to deploy the aileron; and
a channel extending in a span-wise direction along the wing and positioned below the actuator bracket;
wherein the area of the actuator bracket which engages the top face of the trailing edge cove is greater than the area of the actuator bracket which engages the front face of the trailing edge cove.

12. An aircraft wing according to claim 11, wherein the actuator bracket is mounted to the top face of the trailing edge cove with a first set of fasteners, and to the front face of the trailing edge cove by a second set of fasteners, and wherein the number of fasteners in the first set is more than the number of fasteners in the second set.

* * * * *